United States Patent Office 3,598,831
Patented Aug. 10, 1971

3,598,831
ANTHRAQUINONE PIGMENT DYES
Xaver Pfister, Riehen, near Basel, Switzerland, assignor to Sandoz Ltd. (also known as Sandoz AG), Basel, Switzerland
No Drawing. Continuation-in-part of application Ser. No. 466,112, June 22, 1965. This application Sept. 29, 1967, Ser. No. 671,607
Claims priority, application Switzerland, July 3, 1964, 8,732/64; July 17, 1964, 9,383/64
Int. Cl. C09b 1/42
U.S. Cl. 260—303                     10 Claims

ABSTRACT OF THE DISCLOSURE

The invention relates to dyes of the anthraquinone series which are highly apt for the pigmentation of semi- or fully synthetic artificial materials, natural and synthetic resins and their solutions, natural or synthetic rubber or paper. The pigmented materials show good color resistance to heat, light and chemicals, and the pigment shows no tendency to migration.

This application is a continuation-in-part of the application Ser. No. 466,112, filed June 22, 1965, now abandoned.

DESCRIPTION

The new pigment dyes are of the formula

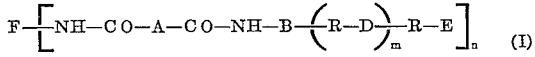

wherein

F is the radical of an anthraquinone dye, free from sulfonic acid and carboxylic acid groups,
A, B, D and E are radicals of the benzene series which may be individually substituted by halogen, i.e. fluorine, chlorine or bromine atoms, methyl, methoxy, ethoxy or nitro groups,
R is —CO—NH— or —NH—CO—,
$m$ is 0 or 1, and $n$ is 1 or 2.

The process for the production of these dyes consists in the successive introduction into 1 mol of a dye radical of formula

of $n$ moles of a radical of formula

—CO—A—CO—                     (III)

and $n$ moles of a radical of formula

The dye radicals F— may bear non-water-solubilizing substituents, e.g. fluorine, chlorine or bromine atoms, hydroxyl, methyl, methoxy, methylamino, ethylamino, unsubstituted or chloro-, bromo-, methyl-, methoxy- or ethoxy-substituted phenylamino, unsubstituted or chloro-, bromo-, methyl-, methoxy- or ethoxy-substituted phenylthio, naphthylthio, carboxylic acid methyl- or ethyl-ester groups or a benzthiazolylmercapto group. The anthraquinone dyes in particular may contain condensed iso- or hetero-cyclic rings, preferably 5- or 6-membered rings. Some preferred anthraquinone dyes are the following:

1-aminoanthraquinone;
1,4-, 1,5-, 1,6-, 1,7- or 1,8-diaminoanthraquinone;
1-amino-4-hydroxyanthraquinone;
1-amino-4-methoxyanthraquinone;
1-amino-3-, -4-, -5-, -6-, -7- or -8-chloroanthraquinone;
1-amino-6,7-dichloroanthraquinone;
1-amino-4-, -5- or -8-benzoylaminoanthraquinone;
1-amino-5,8-dibenzoylaminoanthraquinone;
1,5-diamino-4-hydroxyanthraquinone;
4-amino-1,9-isothiazolanthrone;
1,5-diamino-4,8-dihydroxyanthraquinone;
1-amino-2-methylanthraquinone;
2-brom-1,4-diaminoanthraquinone;
1,4-diamino-2-methoxy- or -2-methylanthraquinone;
1-amino-4- or -5-phenylaminoanthraquinone;
1-amino-4- or -5-(2',4',6'-trimethyl)-phenylaminoanthraquinone;
1-amino-4-(4'-chloro)-phenylamino-6-chloroanthraquinone;
1-amino-4-phenylthioanthraquinone;
1-amino-4-(4'-, 3'- or 2'-methyl)-phenylthioanthraquinone;
1-amino-4-(1'-naphthyl)-thioanthraquinone;
1-(4'-amino)-phenylaminoanthraquinone;
1-amino-2-(4'-amino)-phenoxy-4-hydroxyanthraquinone, or dyes of the formula:

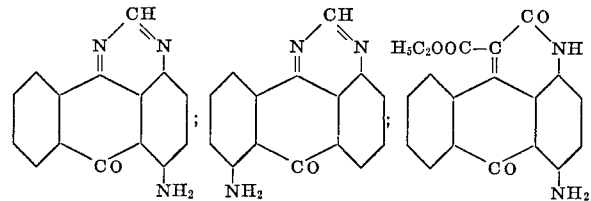

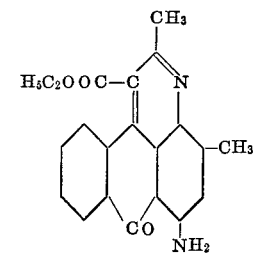

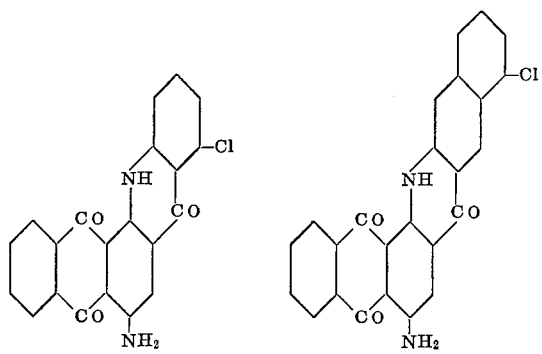

Preferred radicals A are for example: 1,4-phenylene, 2-chloro-1,4-phenylene, 2-bromo-1,4-phenylene or 2,5-dichloro-1,4-phenylene.

The introduction of the radicals (III) or (IV) into the dye radical (II) can be effected, for example, by reacting in either order $n$ moles of a dicarboxylic acid of formula $$\text{HOOC—A—COOH} \quad (VI)$$

or of one of its functional derivatives, with 1 mole of an amino dye of formula

(VII)

and with $n$ moles of an amino compound of formula $$\text{H}_2\text{N—B—(R—D)}_m\text{—R—E} \quad (VIII)$$

In other words, the dicarboxylic acid of Formula VI or one of its functional derivatives (preferably the acid chloride or bromide) can be reacted first with the amino dye (VII) and then with the amino compound (VIII), or alternatively with the amino compound (VIII) first and then with the amino dye (VII).

The introduction of the radicals (III) and (IV) into the dye radical can be carried out in two stages. In the first stage $n$ moles of a dicarboxylic acid of Formula VI or of one of its functional derivatives are reacted unilaterally with 1 mole of an amino dye of Formula VII. In the second stage the reaction product is treated in one of the following ways:

(a) Condensation with $n$ moles of an amine of formula $$\text{H}_2\text{N—B—X} \quad (IX)$$

wherein X represents a substituent convertible into an amino group, such as nitro, —N=S=O or acylamino, e.g. alkanoylamino (acetylamino, propionylamino, butyrylamino) or alkoxycarbonylamino (methoxycarbonylamino, ethoxycarbonylamino), conversion of the substituent X into the amino group, e.g. by reduction of the nitro group or hydrolysis of the —N=S=O— or acylamino group, and acylation of the amino group or groups with $n$ moles of a carboxylic acid having the formula $$\text{HO—(OC—D—NH)}_m\text{—OC—E} \quad (X)$$

or of one of its functional derivatives.

(b) Condensation with $n$ moles of an amine of formula $$\text{H}_2\text{N—B—COOH} \quad (XI)$$

and further condensation of the condensation product with $n$ moles of an amine of formula $$\text{H—(HN—D—CO)}_m\text{—HN—E} \quad (XII)$$

(c) Condensation with $n$ moles of an amine of Formula XI and further condensation of the condensation product with $n$ moles of an amine of formula $$\text{H}_2\text{N—D—NH—OC—E} \quad (XIII)$$

The acylation or amidation reaction are performed preferably in the presence of a diluent, e.g. aromatic hydrocarbon which may be halogenated or nitrated, such as toluene, xylene, chlorobenzene, dichlorobenzene or nitrobenzene, an ether, e.g. dioxan, or a substituted or unsubstituted acid amide, e.g. dimethyl formamide, and in the temperature range of 60° to 160° C., e.g. 60–90° C. or preferably 70–80° C. for the first and 90–160° C. or preferably 130–140° C. for the second acylation. It is of advantage to add an acid-binding agent, for instance pyridine, trimethylamine, sodium carbonate or sodium bicarbonate.

The nitro group can be reduced with sodium sulfide or sodium hydrogen sulfide in alcoholic medium at 70–90° C., or by the Béchamp method in alcoholic medium or in a mixture of alcohol and dimethyl formamide at about 80–90° C., or by catalysis in dimethyl formamide at 70–100° C. Cleavage of the alkoxycarbonyl or alkanoyl group is best effected in alkaline medium, e.g. in aqueous-alcoholic or alcoholic 2 to 10% sodium or potassium hydroxide solution at temperatures of about 70° to 100° C.

Hydrolysis of the —N=S=O— group can be readily performed by suspending the product in water at 20 to 100° C., or preferably 80–100° C., with stirring.

The final dyes are valuable pigments. They can be converted into commercial pigment pastes by grinding in ball or roller mills, if necessary with the addition of a dispersing agent, for example one of the condensation products of naphthalenesulfonic acids and formaldehyde, after which they are dried in jet or other suitable driers. In this form they are excellent for the pigmentation of semi- or full synthetic artificial materials, natural and synthetic resins and their solutions, natural and synthetic rubber or paper.

Among the artificial materials the following may be mentioned: esterified cellulose, such as cellulose diacetate and cellulose triacetate, nitrocellulose, and the polymers and copolymers produced by polycondensation, polyaddition or polymerisation of low molecular-weight compounds, e.g. polyolefins, polystyrene, polyvinyl chloride, polyvinyl acetate, polyamides, linear and cross-linked polyesters, polycarbonates, polyurethanes and polyacrylonitriles and also viscose. These may contain solvents or plasticizers and other additives and may be processed as textile fibers, moulded goods, or surface coating materials. The pigments can also be used for pigmenting natural binders, e.g. starches, sodium alginates, gum tragacanth, British gum, crystal gum, locust bean gum, and collagens, such as gelatins. The pigmented materials show good color resistance to heat, light and chemicals, and the pigment shows no tendency to migration.

The parts specified in the examples are by weight and the temperatures are given in degrees centigrade.

EXAMPLE 1

30 parts of terephthalic acid dichloride are dissolved in 150 parts of water-free nitrobenzene, and at 70–80° 10 parts of finely divided 1-aminoanthraquinone are gradually added to the solution. This temperature is maintained until no free 1-amino-anthraquinone is indicated, upon which it is brought down to 30°. The mixture is stirred for a further 2 hours, the reaction product filtered off and the residual unreacted terephthalic acid dichloride washed out with water-free nitrobenzene. The product is then suspended in 150 parts of nitrobenzene. To the suspension are added 5 parts of pyridine and 14 parts of 4-aminobenzene-1-carboxylic acid-phenyl amide, which can be produced, for example, according to the method given in the J. Am. Chem. Soc. 67, 1862–3 (1945). The mixture is held at 130° for 3 hours with constant stirring, after which the product is filtered off at the same temperature, washed with nitrobenzene, then with ethanol and finally with water, and dried at 100°.

10 parts of the resulting dye are treated for 1 hour in 200 parts of boiling dimethyl formamide. On cooling to 20° it is filtered off, washed with dimethyl formamide and then with water, and dried. A dye is obtained which, after preparation as a pigment by one of the normal methods, gives non-migrating yellow shades in polyvinyl chloride.

EXAMPLE 2

20 parts of 4-aminobenzene-1-carboxylic acid phenylamide, produced as given by Lockemann in "Berichte der deutschen chemischen Gesellschaft," 75 1911–21 (1942), are added in small portions with stirring to a solution of 60 parts of terephthalic acid dichloride in 200 parts of nitrobenzene at 80°. Stirring is continued for 4 hours at 90°, then the mixture is cooled to 20°, the product filtered off, and freed of unreacted terephthalic acid dichloride by washing with dry nitrobenzene. It is not dried but suspended immediately in 300 parts of nitrobenzene and reacted with 18 parts of a dye of the formula

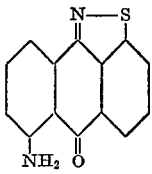

and 8 parts of pyridine. After stirring for 4 hours at 130°, the reaction product is filtered off without cooling, washed with ethanol and finally with water, and dried at 100°.

20 parts of the dye thus formed are boiled in 300 parts of dimethyl formamide for 1 hour. On cooling to 20°, it is filtered off, washed with dimethyl formamide and then with water, and dried at 100°. It can be ground by one of the standard methods to give a pigment powder which pigments polyvinyl chloride in migration-resistant yellow shades.

EXAMPLE 3

10 parts of the condensation product of equimolar amounts of 1-amino-4-hydroxyanthraquinone and terephthalic acid dichloride, produced as described in Example 1, are reacted with 14 parts of 4-aminobenzene-1-carboxylic acid phenylamide in 200 parts of nitrobenzene at 95–100° under the conditions stated in Example 1. The product is a non-migrating red pigment.

EXAMPLE 4

30 parts of terephthalic acid dichloride are dissolved in 150 parts of water-free nitrobenzene, and at 70–80° 10 parts of finely divided 1-aminoanthraquinone are gradually added with stirring. The temperature is maintained at 70–80° until no further 1-aminoanthraquinone is indicated. The mixture is then cooled to 30°, stirred for 2 hours, and the reaction product filtered off and washed with water-free nitrobenzene to eliminate the residual unreacted terephthalic acid dichloride. It is suspended in 150 parts of nitrobenzene, and 14 parts of benzenecarboxylic acid - (4' - amino)-phenylamide, prepared, for example, as given in the J. Am. Chem. Soc. 65, 2470 (1943), are added, together with 5 parts of pyridine. The suspension is kept at 130° for 3 hours and constantly stirred. The product is then filtered off at 130°, washed with nitrobenzene, then with ethanol and finally with water, and dried at 100°. 10 parts of the dye formed are boiled for 1 hour in 200 parts of dimethyl formamide. On cooling at 20° it is filtered off, washed with dimethyl formamide and then with water and dried. It can be worked up as a pigment by one of the normal methods, in which form it gives light-fast and migration-resistant yellow shades in polyvinyl chloride.

The 1-aminoanthraquinone specified in this example can be replaced by 1-amino-4-hydroxyanthraquinone, 1-amino-4-benzoylaminoanthraquinone, 1 - amino-4-phenylthioanthraquinone, 1-amino - 4 - (4' - chloro)-phenylthioanthraquinone, 1 - amino - 4-benzothiazolyl-thio-anthraquinone or 1-(4'-amino)-phenylaminoanthraquinone; with these anthraquinones pigments are obtained which give light-fast, migration-resistant yellowish red to bluish red shades in polyvinyl chloride.

EXAMPLE 5

20 parts of benzenecarboxylic acid-(4'-amino)-phenylamide, which can be prepared, e.g., by the method given in the J. Am. Chem. Soc. 65, 2470 (1943), are added slowly with stirring to a solution of 60 parts of terephthalic acid dichloride in 200 parts of nitrobenzene at 80°. Stirring is continued for 4 hours at 90°. On cooling to 20°, the product is filtered off and freed of residual uncondensed terephthalic acid dichloride by washing with water-free nitrobenzene. Without intermediate drying it is suspended in 300 parts of nitrobenzene, and 18 parts of the dye of formula

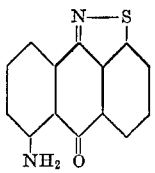

and 5 parts of pyridine are added to the suspension. Condensation is effected in 4 hours at 130° with constant stirring, after which the dye is filtered from the hot medium, washed successively with nitrobenzene, ethanol and water, and dried at 100°.

200 parts of the resulting dye are boiled for 1 hour in 300 parts of dimethylformamide. On cooling to 20° it is filtered off, washed with dimethyl formamide and then with water, and dried at 100°. It can be ground by one of the known methods to give a pigment powder which pigments polyvinyl chloride in migration-resistant yellow shades.

The benzenecarboxylic acid-(4'-amino)-phenylamide can be replaced by 4-chlorobenzenecarboxylic acid-(4'-amino)-phenylamide or benzene carboxylic acid-(2'-chloro-4'-amino)-phenylamide, in which case similar yellow pigments with the same good resistance to migration are obtained.

EXAMPLE OF PIGMENTATION 5 parts of the pigment of the above example are mixed with 1000 parts of poly-ε-caprolactam, the mixture melted at 285° in a nitrogeneous atmosphere and extruded. A filament of yellow color is obtained which is very fast to light, rubbing, wet treatment and sublimation, and suitable for further textile processing.

EXAMPLE 6

30 parts of terephthalic acid dichloride are dissolved in 150 parts of waterfree chlorobenzene, and at 70–75° 10 parts of finely divided 1-amino-4-methoxyanthraquinone are gradually added. The reaction mixture is held at 70–75° until no further amine is indicated, after which it is cooled and stirred for 10 hours at 20–30°. The product is filtered off and washed with waterfree chlorobenzene to eliminate residual unreacted terephthalic acid dichloride. It is then suspended in 300 parts of chlorobenzene, to which 14 parts of 4-amino-1-benzenecarboxylic acid phenylamide (prepared as given in Example 1) and 5 parts of pyridine are added. The reaction mixture is heated to 130° and held at this temperature for 6 hours with constant stirring. The dye thus formed is filtered off at 130°, washed successively with chlorobenzene, ethanol and water, and dried at 100°.

10 parts of the dye are boiled for 1 hour in 200 parts of dimethyl formamide. The mixture is allowed to cool to 20°, the dye filtered off, washed with dimethyl formamide and then with water, and dried. After conversion into a pigment powder by one of the normal methods, it can be used for pigmenting polyvinyl chloride in migration-resistant reddish yellow shades.

The 1-amino-4-methoxyanthraquinone used in this example can be replaced by the amine A of the following table; the terephthalic acid dichloride, by the acid chloride B; and the 4-amino-1-benzenecarboxylic acid phenylamide, by the amine C, to give the pigments listed in the table.

TABLE

| Ex. No. | (I) Amine A | (II) Acid chloride B | (III) Amine C | (IV) Shade in polyvinyl chloride |
|---|---|---|---|---|
| 7 | 1-amino-7-chloroanthraquinone | 2-bromoterephthalic acid dichloride | 4-amino-1-benzene carboxylic acid phenylamide. | Yellow. |
| 8 | 1-amino-6,7-dichloro-anthraquinone | 2-chloroterephthalic acid dichloride | 4-amino-1-benzene carboxylic acid-(4'-methoxy)-phenylamide. | Do. |
| 9 | 1-amino-7-chloroanthraquinone | Terephthalic acid dichloride | 4-amino-1-benzene carboxylic acid phenylamide. | Do. |
| 10 | 1-amino-6-bromoanthraquinone | do | do | Do. |
| 11 | 1-amino-6-fluoroanthraquinone | do | do | Do. |
| 12 | 1-amino-6-chloranthraquinone | do | 4-amino-1-benzene carboxylic acid-(4'-methyl)-phenylamide. | Do. |
| 13 | 1-amino-4-naphthyl-1'-thioanthraquinone. | do | 2,4-dichlorobenzene carboxylic acid-(4'-amino)-phenylamide. | Red. |
| 14 | 1-amino-4-(4'-methyl)-phenylthioanthraquinone. | do | do | Red. |
| 15 | 4-amino-1,2-benzoanthraquinoneacridone | do | 4-amino-1-benzene carboxylic acid-(3'-methyl)-phenylamide. | Violet. |
| 16 | 1-amino-5-(4'-chloro)-benzoylaminoanthraquinone. | do | 4-amino-1-benzene carboxylic acid phenylamide. | Yellow. |
| 17 | 1-amino-5-benzoylaminoanthraquinone | 2,5-dichloroterephthalic acid dichloride | 3-methyl-4-amino-1-benzene carboxylic acid phenylamide. | Do. |
| 18 | 1,4-diaminoanthraquinone | Terephthalic acid dichloride | 4-fluorobenzene carboxylic acid-(4'-amino)-phenylamide. | Bordeaux. |
| 19 | 1,4-diaminoanthraquinone | Terephthalic acid dichloride | Benzene carboxylic acid-(4'-amino)-phenylamide. | Do. |
| 20 | 1,4-diamino-2-bromoanthraquinone | do | do | Do. |
| 21 | 1,4-diamino-2-methoxyanthraquinone | do | do | Do. |
| 22 | 1,4-diamino-2-methylanthraquinone | do | do | Do. |
| 23 | 1-amino-4-(4'-methoxy)-phenylaminoanthraquinone. | 2-chloroterephthalic acid dichloride | 2-chloro-4-aminobenzenecarboxylic acid phenylamide. | Violet. |
| 24 | 1-amino-4-phenylaminoanthraquinone | do | 4-amino-benzene carboxylic acid-(4'-chloro)-phenylamide. | Do. |
| 25 | 1-amino-4-(4'-ethoxy)-phenylaminoanthraquinone. | Terephthalic acid dichloride | do | Do. |
| 26 | 1-amino-4-(4'-methyl)-phenylaminoanthraquinone. | do | 4-aminobenzene carboxylic acid-(3'-chloro)-phenylamide. | Do. |
| 27 | do | do | 4-aminobenzene carboxylic acid-(4'-ethoxy)-phenylamide. | Do. |
| 28 | do | do | 4-aminobenzenecarboxylic acid-(2'-chloro)-phenylamide. | Do. |
| 29 | 1-amino-4-(4'-chloro)-phenylaminoanthraquinone. | do | 4-aminobenzenecarboxylic acid-(2'-methoxy)-phenylamide. | Do. |
| 30 | 1-amino-4-(2', 4', 6'-trimethyl)phenylaminoanthraquinone. | do | 4-aminobenzenecarboxylic acid phenylamide. | Do. |
| 31 | 1-amino-4-(3'-chloro)phenylaminoanthraquinone. | do | 4-aminobenzenecarboxylic acid phenylamide. | Do. |
| 32 | 1-aminoanthraquinone | Terephthalic acid dichloride | 2,4-dichlorobenzene carboxylic acid-(4'-amino)-phenylamide. | Yellow. |
| 33 | do | do | 3,4-dichlorobenzene carboxylic acid-(4'-amino)-phenylamide. | Do. |
| 34 | do | do | 4-nitrobenzene carboxylic acid-(4'-amino)-phenylamide. | Do. |
| 35 | do | 2,5-dibromoterephthalic acid dichloride | do | Do. |
| 36 | 1-amino-4-hydroxyanthraquinone | Terephthalic acid dichloride | do | Yellowish red. |
| 37 | 1-amino-4-(2'-methyl)-phenylthioanthraquinone. | do | Benzenecarboxylic acid-(4'-amino)-phenylamide. | Red. |
| 38 | 1-aminoanthraquinone | do | 4-bromobenzenecarboxylic acid-(4'-amino)-phenylamide. | Yellow. |
| 39 | do | do | 4-methoxybenzenecarboxylic acid-(4'-amino)-phenylamide. | Do. |
| 40 | do | do | 3,4,5-trimethoxybenzenecarboxylic acid-(4'-amino)-phenylamide. | Do. |
| 41 | do | do | 2-chloro-4-nitrobenzenecarboxylic acid-(4'-amino)-phenylamide. | Do. |
| 42 | 1-amino-4-methoxyanthraquinone | do | 4-methylbenzenecarboxylic acid-(4'-amino)-phenylamide. | Reddish yellow. |
| 43 | 1-amino-5,8-di-benzoylaminoanthraquinone. | do | Benzenecarboxylic acid-(4'-amino)-phenylamide. | Bordeaux. |
| 44 | 1,5-diaminoanthraquinone | do | do | Yellow. |
| 45 | 1,8-diaminoanthraquinone | Terephthalic acid dichloride | Benzenecarboxylic acid-(4'-amino)-phenylamide. | Do. |
| 46 | 1-methylamino-4-aminoanthraquinone | do | do | Do. |
| 47 | 1-(4'-amino)-phenylaminoanthraquinone | do | do | Red. |

EXAMPLE 48

32 parts of benzenecarboxylic acid-(4'-amino)-phenylamide, produced as given in Example 4, 42 parts of 4-nitrobenzoyl chloride and 14 parts of pyridine are added to 600 parts of nitrobenzene. The mixture is heated to 130° with stirring and allowed to react for 4 hours at 130–135°. It is then cooled to 50°, on which the suspension is filtered, the residue washed successively with nitrobenzene, ethanol and water, and dried at 100°. 50 parts of benzenecarboxylic acid-[4'-(4''-nitro)-phenylcarbonylamino]-phenylamide are obtained.

28 parts of iron filings are etched with 20 parts of 40% acetic acid. 200 parts of ethanol and 40 parts of the previously obtained benzene carboxylic acid-[4'-(4''-nitro)-phenylcarbonylamino]-phenyl-amide are added, the suspension is diluted with 150 parts of di-methyl formamide and then stirred for 20 hours at 85–89°. After cooling to 20°, the suspension is filtered off and the iron-containing residue washed with ethanol and then with water and dried at 100°. It is suspended in 300 parts of dimethyl formamide, the suspension heated to 145° and filtered off at this temperature from the residual iron, which is then washed with dimethylformamide. The filtrate is diluted with 500 parts of water, the suspension filtered, the residue washed with water until it is free of dimethyl formamide, and dried at 100°. 32 parts of benzenecarboxylic acid-[4' - (4'' - amino) - phenyl - carbonyl - amino] - phenylamide are obtained.

16 parts of finely divided 1-amino-4-(4'-chloro)-phenylthioanthraquinone are added gradually with stirring to a solution of 28 parts of terephthalic acid dichloride in 240 parts of nitrobenzene at 70°. The temperature is maintained at 70–75° until no further amine is indicated, after which the mixture is cooled to 20°, stirred for 4 hours at this temperature, filtered, and the residual unreacted terephthalic acid dichloride washed out of the residue with water-free nitrobenzene. The residue is suspended in 400 parts of nitrobenzene, and to the thus prepared suspension are added 15 parts of the previously obtained benzenecarboxylic acid-[4'-(4''-amino)-phenyl-carbonyl-amino]-phenylamide and 3.6 parts of pyridine. The reaction mixture is raised to 130° and allowed to react for 4 hours at this temperature with constant stirring. It is then filtered at 130°, the residue washed successively with nitrobenzene, ethanol and water, and dried at 100°. 10 parts of the dye thus formed are boiled for 1 hour in 200 parts of dimethyl formamide.

After hot filtration the residue is washed first with dimethyl formamide and then with water, and dried at 100°. The dye obtained, which can be worked up as a pigment preparation by one of the standard methods, pigments polyvinyl chloride in a migration-resistant red shade.

When a diamine is used as amine A, e.g. 1,4-diamino-, 1,5-diamino- or 1,8-diamino-anthraquinone, disubstitution products are obtained which correspond to the Formula I in which $n$ stands for the figure 2.

The 1,4-diamino-2-bromo-, -2-methyl- or -2-methoxy-anthraquinones of Examples 20, 21 and 22 give, under the reaction conditions of Examples 1 to 6, derivatives monoacylated in the 4-position only.

Representative dyes of the foregoing examples are as follows:

Example 1

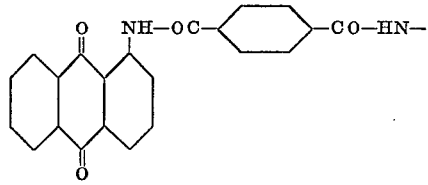

Example 2

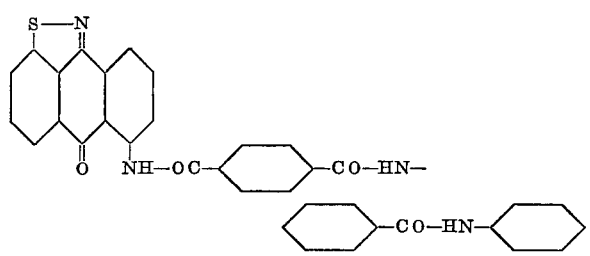

Example 3

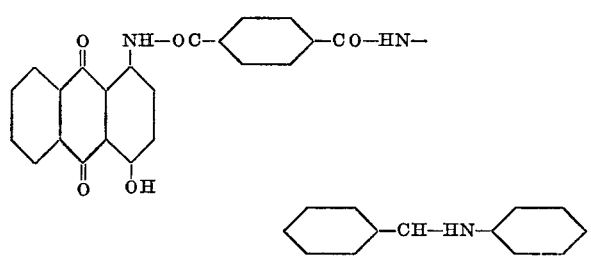

Example 4

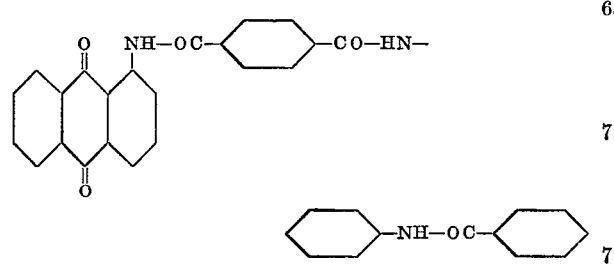

Example 5

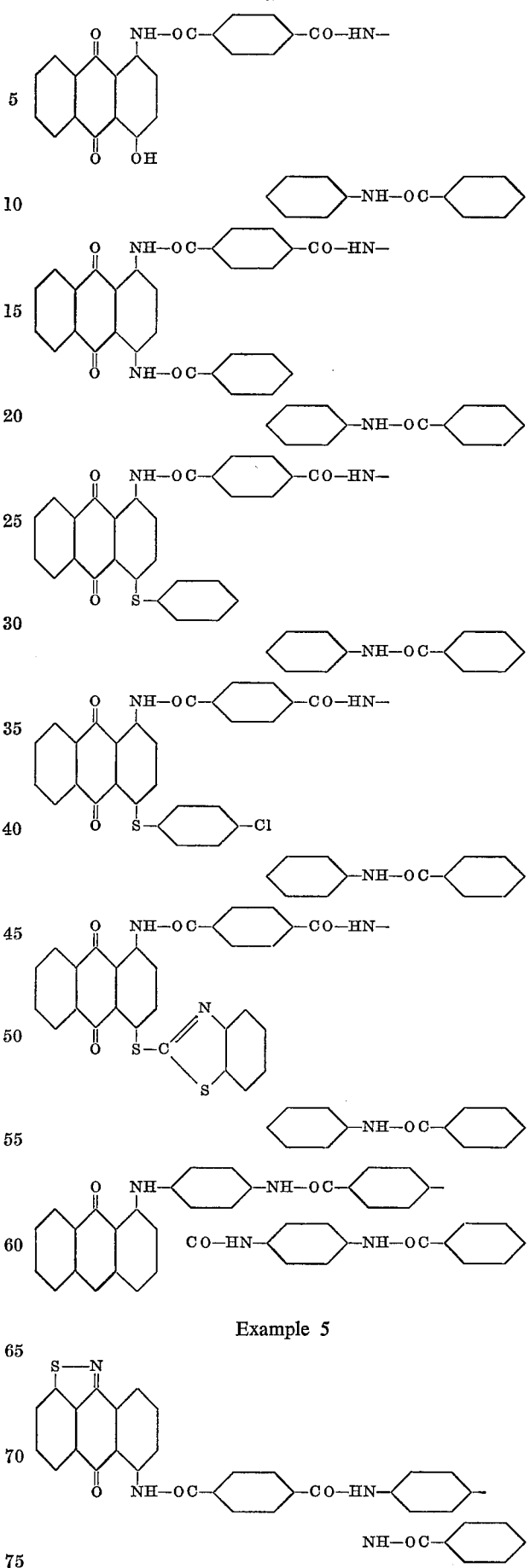

Example 6

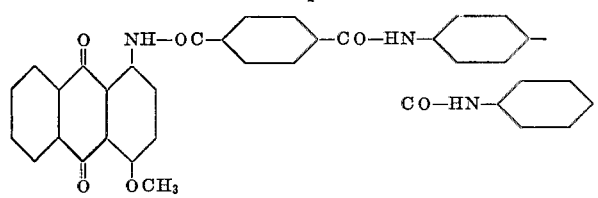

Example 48

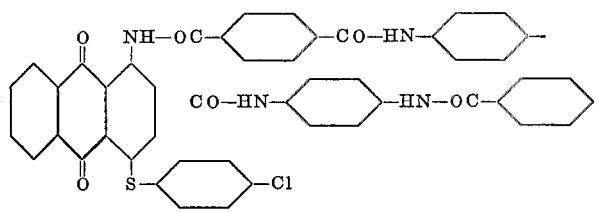

Having thus disclosed the invention what we claim is:
1. Anthraquinone dye free from sulfonic acid and carboxylic acid groups and having an anthraquinone nucleus of the structure

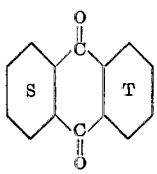

wherein each of rings S and T is, independently, either further unsubstituted or further substituted, any substituent thereon being a member selected from the group consisting of hydroxy, methyl, methoxy, methylamino, fluoro, chloro, bromo, phenylamino, chlorophenylamino, methylphenylamino, trimethylphenylamino, methoxyphenylamino, ethoxyphenylamino, phenlthio, chlorophenylthio, methylphenylthio, naphthylthio, benzoylamino, chlorobenzoylamino and benzothiazolylthio, which structure is directly α-substituted by one or disubstituted in the 1,4-, 1,5-, 1,6-, 1,7- or 1,8-positions by two groups of the formula

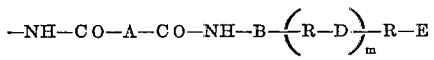

wherein

R is —CO—NH— or —NH—CO—;
$m$ is 0 or 1;
each of A, B and D is unsubstituted or substituted para-phenylene; and
E is unsubstituted phenyl;
any substituted para-phenylene or substituted phenyl sub-substituent being a member selected from the group consisting of fluoro, chloro, bromo, methyl, methoxy, ethoxy and nitro.

2. Dye according to claim 1 wherein the anthraquinone nucleus is 4-benzoylaminoanthraquinone.
3. Dye according to claim 1 wherein the anthraquinone nucleus is 4-phenylthioanthraquinone.
4. Dye according to claim 1 wherein the anthraquinone nucleus is 4-(p-chlorophenylthio)anthraquinone.
5. Dye according to claim 1 wherein the anthraquinone nucleus is 4-benzothiazolylthioanthraquinone.

6. Dye according to claim 1 wherein the anthraquinone nucleus is selected from the group consisting of 4-benzoylaminoanthraquinone (4 - phenylthioanthraquinone, 4-(p-chlorophenylthio)anthraquinone, and 4-benzothiazolylthioanthraquinone.
7. The dye of the formula

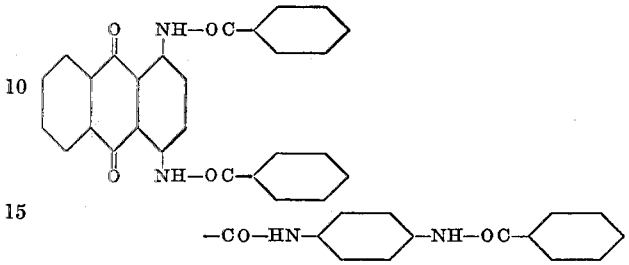

8. The dye of the formula

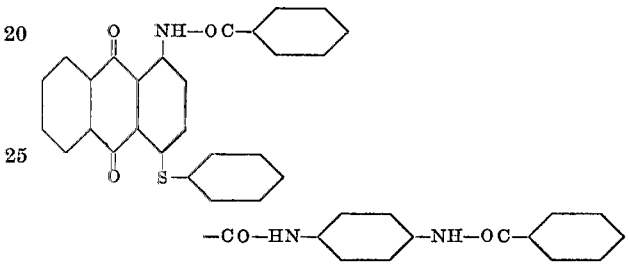

9. The dye of the formula

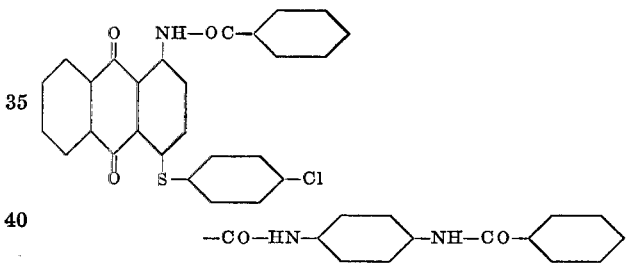

10. The dye of formula

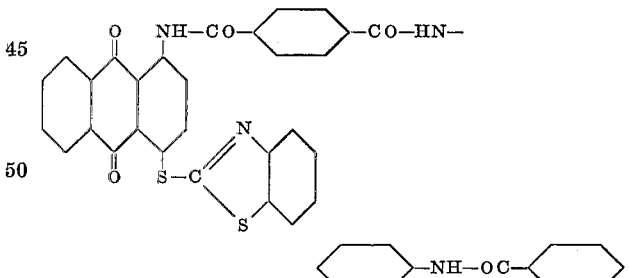

References Cited

UNITED STATES PATENTS 3,361,765    1/1968    Weber et al. _____ 260—377

LEWIS GOTTS, Primary Examiner

E. J. SKELLY, Assistant Examiner

U.S. Cl. X.R.

8—4, 5, 7, 39, 40; 260—261, 272, 277, 278, 377

PO-1050
(5/69)

UNITED STATES PATENT OFFICE
CERTIFICATE OF CORRECTION

Patent No. 3,598,831                    Dated August 10, 1971

Inventor(s) XAVER PFISTER

It is certified that error appears in the above-identified patent and that said Letters Patent are hereby corrected as shown below:

Column 1, line 33, after the formula, "(I)" should read --(I),--; line 56, after the formula, "(IV)" should read --(IV).--. Column 2, line 29, "formula" should read --formulae--; line 35, after the third formula, insert a semicolon --;--; line 45, after the formula, insert a semicolon --;--; line 63, after the first formula, insert a semicolon --;--; after the second formula, insert a period --.--. Column 3, line 18, after the formula, "(VIII)" should read --(VIII).--; line 52, after the formula, "(XII)" should read --(XII).--; line 58, after the formula, "(XIII)" should read --(XIII).--. Column 6, line 25, "20°" should read --20°,--; line 48, "waterfree" should read --water-free--; line 53, "waterfree" should read --water-free--. Column 7, in the heading of the Table, "Ex." should read --Example--; Example 12, in the definition of Amine A, "1-amino-6-chloranthraquinone" should read --1-amino-6-chloroanthraquinone--. Column 8, in the heading of the definition of Amine C, "AmineC" should read --Amine C--. Column 10, line 60, in the formula, "CO-HN-⟨" should read -- -CO-HN-⟨ --;

line 74, in the formula "NH-OC-⟨" should read -- -NH-OC-⟨ --. Column 11, line 5, in the formula, "CO-HN-⟨" should read -- -CO-HN-⟨ --; line 15, in the formula, "CO-HN-⟨" should read -- -CO-HN-⟨ --. Column 12, line 7, in the formula, "NH-OC-⌬" should read --NH-OC-⌬ --; line 20, in the formula, "NH-OC-⌬" should read --NH-OC-⌬ --; line 32, in the formula, "NH-OC-⌬" should read --NH-OC-⌬ --; line 55, in the formula, "⌬-NH-OC-⌬" should read -- ⌬-NH-OC-⌬.

Signed and sealed this 12th day of June 1973.

(SEAL)
Attest:

EDWARD M. FLETCHER, JR.                  ROBERT GOTTSCHALK
Attesting Officer                        Commissioner of Patents